(12) United States Patent
Ziltener et al.

(10) Patent No.: US 12,553,252 B2
(45) Date of Patent: Feb. 17, 2026

(54) LEVELLING SYSTEM

(71) Applicant: Hilti Aktiengesellschaft, Schaan (LI)

(72) Inventors: Michael Ziltener, Siebnen (CH); Achim Hassler, Eschen (LI); Emina Hodzic, Sarajevo (BA)

(73) Assignee: Hilti Aktiengesellschaft, Schaan (LI)

(*) Notice: Subject to any disclaimer, the term of this patent is extended or adjusted under 35 U.S.C. 154(b) by 631 days.

(21) Appl. No.: 17/917,686

(22) PCT Filed: Mar. 30, 2021

(86) PCT No.: PCT/EP2021/058286
§ 371 (c)(1),
(2) Date: Oct. 7, 2022

(87) PCT Pub. No.: WO2021/204593
PCT Pub. Date: Oct. 14, 2021

(65) Prior Publication Data
US 2023/0151630 A1 May 18, 2023

(30) Foreign Application Priority Data

Apr. 9, 2020 (EP) .................................. 20168865

(51) Int. Cl.
*E04H 12/22* (2006.01)
*B25B 21/00* (2006.01)
(52) U.S. Cl.
CPC ....... *E04H 12/2284* (2013.01); *B25B 21/002* (2013.01)
(58) Field of Classification Search
CPC ....... B25F 5/021; B25B 21/00; B25B 21/002; E04H 12/2284

(Continued)

(56) References Cited

U.S. PATENT DOCUMENTS 4,674,870 A * 6/1987 Cain .................... G01C 15/004
356/400
5,207,004 A * 5/1993 Gruetzmacher ......... G01C 9/28
33/379

(Continued)

FOREIGN PATENT DOCUMENTS

| EP | 3192614 A1 * | 7/2017 | ........... B23D 59/001 |
| WO | WO 2019/148178 A1 | 8/2019 | |
| WO | WO-2019156712 A1 * | 8/2019 | ............ B23P 19/066 |

OTHER PUBLICATIONS

PCT/EP2021/058286, International Search Report dated Sep. 14, 2021 (Three (3) pages).

*Primary Examiner* — Peter J Macchiarolo
*Assistant Examiner* — Anna Josephine Saunders
(74) *Attorney, Agent, or Firm* — Crowell & Moring LLP

(57) ABSTRACT

A system includes a power tool that has a rotation output shaft for rotationally driving a levelling mechanism for a structural attachment and has a rotation drive mechanically connected to the rotation output shaft to rotationally drive the rotation output shaft. The system further includes a remote unit that has a first structural attachment contact structure where the first structural attachment contact structure is contactable with the structural attachment and where the remote unit is detached from the power tool. The system additionally includes a control arrangement that has an orientation device configured to provide orientation data relating to an orientation of the first structural attachment contact structure and has a drive controller which is connected to both the rotation drive and the orientation device where the drive controller is configured to influence action of the rotation drive in response to orientation data provided by the orientation device.

16 Claims, 2 Drawing Sheets

(58) Field of Classification Search
USPC ............ 33/365, 373, 379, 382, 383; 173/20; 408/16
See application file for complete search history.

(56) References Cited

U.S. PATENT DOCUMENTS

| | | | | |
|---|---|---|---|---|
| 5,484,026 | A * | 1/1996 | Susaki | E04F 15/024 |
| | | | | 173/4 |
| 6,851,487 | B1 * | 2/2005 | Shotey | B25F 5/00 |
| | | | | 173/171 |
| 6,926,473 | B2 * | 8/2005 | Luebke | G01V 3/15 |
| | | | | 408/16 |
| 7,676,940 | B2 * | 3/2010 | Spaulding | G01C 9/28 |
| | | | | 33/383 |
| 9,464,893 | B2 * | 10/2016 | Vanko | B23Q 17/22 |
| 10,589,413 | B2 * | 3/2020 | Goble | F16P 3/008 |
| 10,807,219 | B2 * | 10/2020 | Mueckl | G01B 11/14 |
| 11,317,267 | B2 * | 4/2022 | Vetter | H04W 4/38 |
| 11,440,153 | B2 * | 9/2022 | Rzasa | B25F 5/00 |
| 12,020,485 | B2 * | 6/2024 | Marquette | F16P 3/001 |
| 2001/0053313 | A1 * | 12/2001 | Luebke | G01V 3/15 |
| | | | | 408/124 |
| 2012/0174525 | A1 * | 7/2012 | Hinshaw | B25C 1/00 |
| | | | | 52/749.1 |
| 2013/0068743 | A1 * | 3/2013 | Delin | B23K 37/0205 |
| | | | | 219/130.01 |
| 2016/0342151 | A1 * | 11/2016 | Dey, IV | G06F 3/04847 |
| 2017/0183891 | A1 * | 6/2017 | Roddy | E04H 17/263 |
| 2017/0216986 | A1 * | 8/2017 | Dey, IV | B23D 51/16 |
| 2018/0065232 | A1 * | 3/2018 | Mueckl | B25B 21/00 |
| 2021/0034032 | A1 * | 2/2021 | Hebenstreit | B23Q 17/2233 |
| 2023/0151630 | A1 * | 5/2023 | Ziltener | E04H 12/2284 |
| | | | | 521/155 |
| 2024/0175457 | A1 * | 5/2024 | Ziltener | F16B 25/0026 |

* cited by examiner

LEVELLING SYSTEM

BACKGROUND AND SUMMARY OF THE INVENTION

The invention relates to a levelling system.

Structural attachments, for example columns or posts, can be orientated with respect to a base, for example a concrete foundation, by means of threaded adjustment fasteners, such as screw bolts or nuts. Positioning of the adjustment fasteners can be effected using a bubble level, which can be tedious, in particular if a plurality of structural attachments needs to be orientated.

It can be considered an object of the invention to facilitate positioning of a structural attachment in a particularly easy, efficient, reliable and cost-effective manner.

The invention provides a system comprising a power tool comprising a rotation output shaft for rotationally driving a levelling mechanism for a structural attachment, and a rotation drive mechanically connected to the rotation output shaft to rotationally drive the rotation output shaft, a remote unit comprising a first structural attachment contact structure for being placed into contact with the structural attachment, wherein the remote unit is detached from the power tool so that it can be moved independently of the power tool at least by a certain distance, and a control arrangement comprising an orientation device configured to provide orientation data relating to the orientation of the first structural attachment contact structure, and a drive controller, which is connected to both the rotation drive and to the orientation device, wherein the drive controller is configured to influence action of the rotation drive in response to orientation data provided by the orientation device.

A fundamental idea of the invention can be seen in providing a system comprising a power tool for rotationally operating a levelling mechanism for the structural attachment, and a remote unit, which is intended to be placed on the structural attachment while the levelling mechanism for the structural attachment is operated. This remote unit acquires orientation data relating to the orientation of the structural attachment, and a drive controller controls rotation of the power tool dependent on the orientation data, whereby an automated levelling system can be provided.

The structural attachment that is to be orientated can preferably be a steel column, which is intended to be orientated vertically. But generally, all types of structural attachments could be used, and the target orientation does not necessarily have to be vertical.

The levelling mechanism that is intended to be rotationally operated by the power tool can be any mechanism that is suitable to translate rotational motion, in particular rotational motion imparted by the power tool, into linear motion, in particular into linear motion of a stop for the structural attachment. The levelling mechanism could for example include a screw drive, i.e., a mechanism that converts rotational motion into linear motion by means of meshing screw thread. The screw drive could for example include a screw with a shoulder for the structural attachment, wherein rotation of the screw within the base causes the screw, including the shoulder, to axially move relatively to the base. The screw drive could also include a nut arranged on a correspondingly threaded rod, wherein rotation of the nut with respect to the threaded rod causes the nut to axially move relatively to the threaded rod. The levelling mechanism could also be more complex and include, for example, a rack and pinion mechanism.

The power tool is preferably a handheld power tool. The rotation output shaft can be coupled to the external levelling mechanism so as to rotationally drive the levelling mechanism, i.e., so that rotation of the rotation output shaft causes a corresponding part of the levelling mechanism to co-rotate. For being rotationally coupled to the levelling mechanism, the rotation output shaft can, for example, have a chuck, in which a bit that corresponds to the corresponding part of the levelling mechanism can be arranged. In another embodiment, the bit that corresponds to the corresponding part of the levelling mechanism can be integrally formed on the rotation output shaft. The rotation drive is configured for setting the rotation output shaft into rotation.

The remote unit and the power tool might be mechanically connected, for example by a transmission cable that might be provided to transfer data between the remote unit and the power tool, or by a captive filament intended to prevent loss of the remote unit. In this case, the remote unit can be moved independently of the power tool by a certain distance only. It is, however, particularly preferred that the remote unit and the power tool are mechanically separate elements. In this case, the remote unit can be moved fully independently of the power tool. A wireless transmission path can be provided to transfer data between the remote unit and the power tool.

The first structural attachment contact structure is intended to be placed into mechanical contact with the structural attachment, so that the first structural attachment contact structure touches the surface of the structural attachment. In this touching position, the orientation of the remote unit corelates to the alignment of the structural attachment.

The control arrangement comprises the orientation device and the drive controller. The orientation device provides orientation data relating to the orientation of the first structural attachment contact structure, such as roll and pitch of the first structural attachment contact structure with respect to the field of gravity. The orientation device preferably comprises at least one sensor, such as an accelerometer, a gyroscope, or a combination of these sensors and other sensors, all preferably located at, in particular in, the remote unit. Preferably, the orientation device includes a three-axis accelerometer to detect orientation relative to the field of gravity and a plurality of gyroscopes to detect rotation. Other sensors, such as magnetometers, could be used in various modifications. An example of a specific sensor is the Invensense MPU-6050 among others. In addition to the at least one sensor, the orientation device might include at least one processor to compute the orientation based on input from the at least one sensor.

The drive controller is connected to both the rotation drive and to the orientation device, in particular for signal transfer. In particular, the drive controller can be electronically connected to the rotation drive and/or connected to communicate with the orientation device, unidirectionally or bidirectionally, and possibly also including a wireless transmission path. The drive controller is configured to influence action of the rotation drive in response to orientation data provided by the orientation device. It might for example accelerate, decelerate or reverse rotation of the rotation drive in response to orientation data provided by the orientation device.

The orientation data is preferably angular orientation data relating to the angular orientation of the first structural attachment contact structure, in particular with respect to the field of gravity. This angular orientation data could for example be pitch or roll of the first structural attachment contact structure. Relying on angular orientation data can provide a particular reliable and easy-to-use system at low effort.

According to another preferred embodiment of the invention, the drive controller can be configured to stop the rotation drive when the first structural attachment contact structure reaches a threshold inclination. Thus, the rotation output shaft will stop rotating and the levelling mechanism will no longer be actuated when the predetermined threshold inclination is reached. This can provide a particular easy and reliable operation mode.

Preferably, the drive controller is configured to decelerate the rotation drive when the first structural attachment contact structure approaches a threshold inclination. Accordingly, the drive controller causes the rotation of the rotation output shaft to become slower as the difference between the actual inclination of the first structural attachment contact structure and the threshold inclination decreases. This can counteract unwanted overshooting, potentially further improving reliability and/or speed of operation.

Preferentially, the threshold inclinations mentioned above can be one and the same.

It is particularly preferred that the threshold inclination is vertical alignment of the first structural attachment contact structure, i.e., alignment parallel to the field of gravity. Accordingly, the drive controller can be configured to stop the rotation drive when the first structural attachment contact structure reaches vertical alignment, and/or the drive controller can be configured to decelerate the rotation drive when the first structural attachment contact structure approaches vertical alignment. This can further improve handling and reliability.

The drive controller can, advantageously, be configured to reverse the rotation drive in response to orientation data provided by the orientation device. This can allow automatic correction in case of overshooting scenarios, which in term can further improve reliability and ease of use.

The rotation drive preferably includes an electric motor, in particular for actuating the rotation output shaft. In this case, the power tool is an electric power tool.

The drive controller could include an auxiliary braking mechanism for braking the electric motor in response to orientation data provided by the orientation device. However, it is particularly preferred that the drive controller is configured to modify the characteristics of electric power supplied to the electric motor, for example from a battery, in response to orientation data provided by the orientation device. In this case, control takes place via electronics, which can further increase reliability and/or reduce costs. For example, the drive controller could include a H-bridge, electrically connected to both the electric motor and to a power source such as a battery, and the H-bridge can be set in response to orientation data provided by the orientation device.

As already mentioned above, the orientation device can, advantageously, include at least one accelerometer that is provided at the remote unit, more preferably in the remote unit. This can permit determining inclination in a particularly easy and effective manner. The accelerometer can be, preferably, a MEMS accelerometer The first structural attachment contact structure could include a plurality of distinct contact points, which can be preferably arranged so as to lie within a virtual plane. Preferably, however, the first structural attachment contact structure includes a plane, i.e., flat surface, which can provide for a particularly reliable mechanical contact with the structural attachment at low effort.

In other preferred embodiment of the invention, the remote unit comprises a second structural attachment contact structure for being placed into contact with the structural attachment, and the orientation device is configured to provide orientation data relating to the orientation of the first structural attachment contact structure and of the second structural attachment contact structure. The first structural attachment contact structure and the second structural attachment contact structure are preferably arranged in a perpendicular relationship. Accordingly, two-dimensional orientation data is acquired and processed, which can improve functionality and speed up installation of more complex configurations. In particular, the orientation device can, advantageously, include at least two accelerometers that are provided at the remote unit, preferably a three-axis-accelerometer.

According to another preferred embodiment of the invention, the control arrangement includes a wireless data transmitter provided at the remote unit and a wireless data receiver provided at the power tool. Accordingly, a wireless transmission path is provided, in particular to transfer orientation data from the remote unit to the power tool, or for connecting subunits of the orientation device or of the drive controller.

It can be, preferably, provided that at least a subunit of the drive controller is removably attached to the power tool. This allows particular versatile use of the power tool, since the subunit of the drive controller can be mounted when the power tool is used for levelling purposes and can be subsequently removed when the power tool is used for other purposes. It is also possible that not only a subunit, but all of the drive controller is removably attached to the power tool.

The power tool can for example be a drill or an impact wrench. An impact wrench can for example be provided when the levelling mechanism comprises a concrete screw embedded in a concrete substrate, as the impact wrench can provide the torque required for this purpose in a particular effective manner.

In particular, the levelling mechanism is not a part of the described system. However, the invention also relates to a levelling arrangement, comprising a system as described, and a levelling mechanism for a structural attachment, wherein the levelling mechanism comprises a screw drive configured to be rotationally actuated by the power tool. The screw drive is able to convert rotation into linear motion for levelling the structural attachment. In particular, a screw drive can be configured as described above.

Features that are described here in connection with the levelling arrangement can also be used in connection with the system, and features that are described here in connection with the system can also be used in connection with the levelling arrangement.

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION OF THE DRAWINGS

Figure 1:
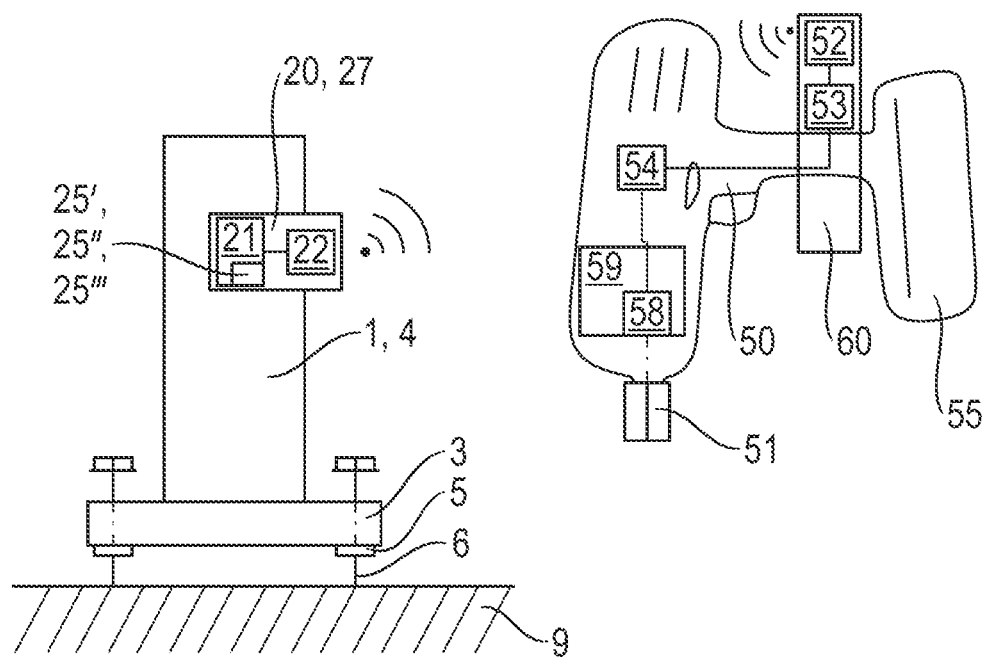
FIG. 1 is a side view of a levelling arrangement, including a system according to the invention.
Figure 2:
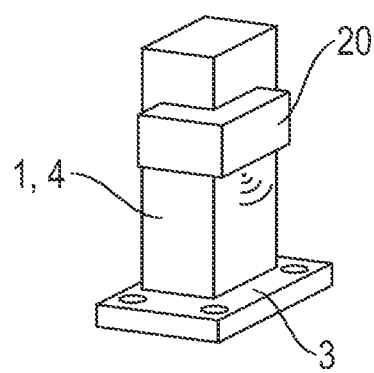
FIG. 2 is a perspective view of the structural attachment and of the remote unit shown in FIG. 1.
Figure 3:
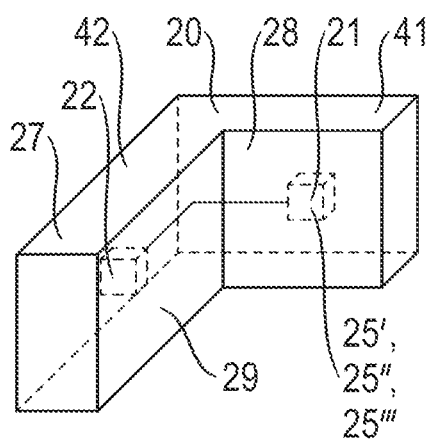
FIG. 3 is another perspective view of the remote unit shown in FIG. 1.
Figure 4:
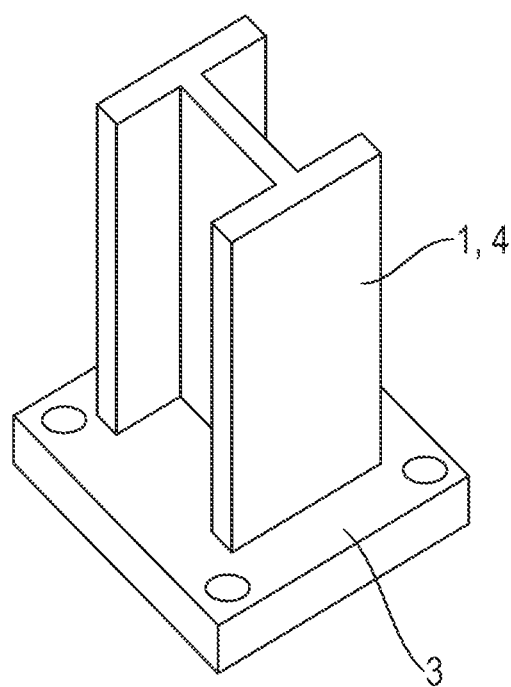
FIG. 4 shows, in perspective view, another type of structural attachment that can be levelled by means of the system of FIG. 1.

FIGS. 1 to 3 illustrate an embodiment of a levelling arrangement, including a system according to the invention. The system can be used for vertically levelling a structural attachment 1 (a column in the shown embodiment), with respect to a base 9 (a concrete foundation in the present embodiment). The structural attachment 1 comprises a baseplate 3 and a beam 4 attached thereto. In the present embodiment, the beam 4 is, by way of example, a hollow square beam. However, other beam shapes are also possible, e.g., an I-beam, as shown in FIG. 4, or a hollow circular beam. The structural attachment 1 is mounted on the foundation by means of screws 6, which are anchored in the base 9, which project through the baseplate 3, and which are each provided with a shoulder 5, wherein the shoulders 5 each form a stop for the baseplate 3. Rotating a screw 6 with respect to the base 9 causes axial displacement of the shoulder 5 and therefore corresponding displacement of the structural attachment 1 resting on the respecting shoulder 5. The screws 6 thus provide a screw drive type levelling mechanism for the structural attachment 1, which levelling mechanism is operated by rotation.

The system comprises a power tool 50, an electric power tool and more specifically an impact wrench in the present embodiment, for rotationally driving the screws 6. The power tool 50 comprises a rotation output shaft 51 for rotationally entraining the screws 6 so as to rotate together with the rotation output shaft 51. The power tool 50 furthermore comprises a rotation drive 59 for rotationally driving the rotation output shaft 51 (together with a screw 6 engaged by the rotation output shaft 51). In the present embodiment, the power tool 50 is an electrical power tool and the rotation drive 59 thus includes an electric motor 58 for agitating the rotation output shaft 51. The power tool 50 is cordless, and as such, it includes a battery 55, which is in particular rechargeable, and which powers the relevant components, in particular the electric motor 58.

The system also includes a remote unit 20. The remote unit 20 and the power tool 50 are separate, and therefore, the remote unit 20 can be positioned independently of the power tool 50. The remote unit comprises a housing 27. This housing 27 is generally L-shaped, comprising a first arm 41 and a second arm 42, wherein the second arm 42 is are arranged in a generally perpendicular relationship with respect to the first arm 41. The remote unit 20 comprises a first structural attachment contact structure 28, which is provided on the first arm 41, as well as a second structural attachment contact structure 29, which is provided on the second arm 42. The first structural attachment contact structure 28 is a plane provided on the housing 27 of the remote unit 20 and also the second structural attachment contact structure 29 is a plane provided on the housing 27 of the remote unit 20, wherein the first structural attachment contact structure 28 extends perpendicular to the second structural attachment contact structure 29. Together, the first structural attachment contact structure 28 and the second structural attachment contact structure 29 form a L-shaped receptacle for the structural attachment 1, in particular for its beam 4. The first structural attachment contact structure 28 and the second structural attachment contact structure 29 are intended to be brought into physical contact with the structural attachment 1, in particular with the beam 4 thereof, when the system is used as intended.

The system further includes an orientation device 21 that is configured to provide orientation data, in particular tilt orientation data, of the remote unit 20. In the present case, the orientation device 21 includes three accelerometer 25', 25", 25''' that are located at the remote unit 20, namely within the housing 27 thereof. These three accelerometers 25', 25", 25''' form a three-axis accelerometer. In the present embodiment, the entirety of the orientation device 21, including a processor for processing the signal of the accelerometers 25', 25", 25''', is located at the remote unit 20. The remote unit 20 further includes a wireless data transmitter 22 for transmitting the orientation data provided by the orientation device 21 to a wireless data receiver 52 provided on the power tool 50.

The power tool 50 comprises a drive controller 53, 54, which is connected to the rotation drive 59 so as to communicate with the rotation drive 59, and which is configured for controlling the rotation drive 59, in particular the electric motor 58 thereof. In particular, the drive controller 53, 54 can be configured to modify the characteristic of electric power supplied to the electric motor 58, which can for example be achieved by means of a H-bridge included in the drive controller 53, 54. The drive controller 53, 54 is also connected to the wireless data receiver 52 so as to communicate with the wireless data receiver 52, in particular for transferring orientation data from the wireless data receiver 52 to the drive controller 53, 54.

In the present embodiment, the power tool 50 comprises a removable unit 60, which can be removed from the remainder of the power tool 50 when no automatic levelling function is required. In the present embodiment, this removable unit includes the wireless data receiver 52 and a subunit, denoted with reference numeral 53, of the drive controller 53, 54.

The drive controller 53, 54 is configured to influence action, in particular rotation, of the rotation drive 59 in response to orientation data relating to the orientation of the first structural attachment contact structure 28, and preferably also to the orientation of the second structural attachment contact structure 29, as provided by the orientation device 21. In use, the remote unit 20 is placed at the structural attachment 1 so that the first structural attachment contact structure 28 and the second structural attachment contact structure 29 both touch the structural attachment 1, so that the orientation of the remote unit 20 corresponds to the orientation of the structural attachment 1. The rotation output shaft 51 is then brought into rotational engagement with the levelling mechanism, in particular with one of the screws 6 thereof, and the rotation drive 59 is then actuated to actuate the levelling mechanism. The drive controller 53, 54 can then automatically slow down rotation of the rotation drive 59 and therefore of the rotation output shaft 51 when a predefined threshold inclination of the remote unit 20 (and thus of the structural attachment 1) is approached, and fully stop rotation of the rotation drive 59 when the predefined threshold inclination is reached, wherein the predefined threshold inclination could be for example vertical alignment of the first structural attachment contact structure 28. The drive controller 53, 54 could also automatically reverse rotation of the rotation drive 59 and therefore of the rotation output shaft 51 in case of an overshoot of the threshold inclination.

The invention claimed is:

1. A system, comprising:
   a power tool comprising:
      a rotation output shaft configured to rotationally drive a levelling mechanism so as to adjust an orientation of a structural attachment, and
      a rotation drive configured to drive the rotation output shaft,
      a drive controller configured to control the rotation drive in response to orientation data received from an orientation device;
   a remote unit physically separate from the power tool, the remote unit comprising:
      a first structural attachment contact structure, wherein the first structural attachment contact structure is configured to contact the structural attachment, and
      the orientation device configured to provide the orientation data to the drive controller, wherein the orientation data characterizes an orientation of the first structural attachment contact structure.

2. The system of claim 1, wherein the orientation data is angular orientation data relating to an angular orientation of the first structural attachment contact structure.

3. The system of claim 1, wherein the drive controller is configured to stop the rotation drive when the first structural attachment contact structure reaches a threshold inclination.

4. The system of claim 1, wherein the drive controller is configured to decelerate the rotation drive when the first structural attachment contact structure approaches a threshold inclination.

5. The system of claim 3, wherein the threshold inclination is vertical alignment of the first structural attachment contact structure.

6. The system of claim 4, wherein the threshold inclination is vertical alignment of the first structural attachment contact structure.

7. The system according to of claim 1, wherein the drive controller is configured to reverse the rotation drive in response to orientation data provided by the orientation device.

8. The system of claim 1, wherein the rotation drive includes an electric motor and wherein the drive controller is configured to modify a characteristic of electric power supplied to the electric motor in response to orientation data provided by the orientation device.

9. The system of claim 1, wherein the orientation device includes at least one accelerometer that is provided at the remote unit.

10. The system of claim 1, wherein the first structural attachment contact structure includes a plane.

11. The system of claim 1, wherein:
    the remote unit comprises a second structural attachment contact structure, wherein the second structural attachment contact structure is contactable with the structural attachment; and
    the orientation device is configured to provide orientation data relating to an orientation of the second structural attachment contact structure.

12. The system of claim 11, wherein the first structural attachment contact structure and the second structural attachment contact structure are disposed in a perpendicular relationship.

13. The system of claim 1, wherein the control arrangement includes a wireless data transmitter provided at the remote unit and a wireless data receiver provided at the power tool.

14. The system of claim 1, wherein at least a subunit of the drive controller is removably attached to the power tool.

15. The system of claim 1, wherein the power tool is a drill or an impact wrench.

16. An adjustment arrangement, comprising:
    the system of claim 1; and
    the levelling mechanism, wherein the levelling mechanism comprises a screw drive configured to be rotationally actuated by the power tool.

* * * * *